US011639452B2

(12) United States Patent
D'Ignoti et al.

(10) Patent No.: US 11,639,452 B2
(45) Date of Patent: May 2, 2023

(54) WATER BASED ADHESIVES FOR HIGH PERFORMANCE APPLICATIONS IN FLEXIBLE FOOD PACKAGING

(71) Applicant: Rohm and Haas Company, Collegeville, PA (US)

(72) Inventors: Vincenzo D'Ignoti, Correggio (IT); Pierluigi Pisoni, Arconate (IT); Marco Frasconi, Fagnano Olona (IT)

(73) Assignee: Rohm and Haas Company, Collegeville, PA (US)

( * ) Notice: Subject to any disclaimer, the term of this patent is extended or adjusted under 35 U.S.C. 154(b) by 468 days.

(21) Appl. No.: 16/637,670

(22) PCT Filed: Jun. 28, 2018

(86) PCT No.: PCT/US2018/040023
§ 371 (c)(1),
(2) Date: Feb. 7, 2020

(87) PCT Pub. No.: WO2019/032218
PCT Pub. Date: Feb. 14, 2019

(65) Prior Publication Data
US 2020/0199417 A1 Jun. 25, 2020

(30) Foreign Application Priority Data
Aug. 8, 2017 (IT) .......... 102017000091909

(51) Int. Cl.
C09J 133/08 (2006.01)
B32B 37/12 (2006.01)
C09J 5/06 (2006.01)

(52) U.S. Cl.
CPC ............. *C09J 133/08* (2013.01); *B32B 37/12* (2013.01); *C09J 5/06* (2013.01); *B32B 2037/1253* (2013.01); *B32B 2311/24* (2013.01); *B32B 2323/04* (2013.01); *B32B 2367/00* (2013.01); *C09J 2433/00* (2013.01)

(58) Field of Classification Search
CPC ......... B32B 2037/1253; B32B 2311/24; B32B 2323/04; B32B 2367/00; B32B 37/12; C09J 133/04; C09J 133/08; C09J 2433/00; C09J 5/06
USPC ..... 156/60, 331.7, 332; 524/556; 525/329.7; 428/411.1, 422.8, 461, 483, 516
See application file for complete search history.

(56) References Cited

U.S. PATENT DOCUMENTS

| 8,754,172 | B2 | 6/2014 | Ha et al. | |
|---|---|---|---|---|
| 10,793,709 | B2 | 10/2020 | Zhang et al. | |
| 11,098,219 | B2 | 8/2021 | Zhang et al. | |
| 2005/0038152 | A1 | 2/2005 | Naito et al. | |
| 2014/0158413 | A1* | 6/2014 | Shanai | C08G 18/6407 524/451 |
| 2015/0104601 | A1* | 4/2015 | Appeaning | C09J 133/26 428/41.4 |
| 2016/0257796 | A1* | 9/2016 | Qu | C08G 18/7671 |
| 2022/0041784 | A1 | 2/2022 | Lester et al. | |

FOREIGN PATENT DOCUMENTS

| CN | 102146268 A | 8/2011 | |
|---|---|---|---|
| CN | 102703003 A | 10/2012 | |
| CN | 102985385 A | 3/2013 | |
| CN | 103059784 A | 4/2013 | |
| CN | 103665253 A | 3/2014 | |
| DE | 19902454 A1 | 8/2000 | |
| JP | 2000198920 A | 7/2000 | |
| JP | 2007224187 A | 9/2007 | |
| WO | WO-2015054821 A1 * | 4/2015 | ........... B32B 15/085 |

OTHER PUBLICATIONS

V. V. Safonov, Structure, Properties, and Applications of Organosilicon Compounds, 2018, pp. 16-18, Moscow.
IT201700091909, Search Report dated Apr. 26, 2018.
PCT/US2018/040023, International Search Report and Written Opinion dated Sep. 5, 2018.
PCT/US2018/040023, International Preliminary Report on Patentability dated Feb. 20, 2020.

* cited by examiner

*Primary Examiner* — Philip C Tucker
*Assistant Examiner* — Brian R Slawski
(74) *Attorney, Agent, or Firm* — Quarles & Brady LLP

(57) ABSTRACT

Water-based acrylic adhesive compositions comprising (A) an acrylic emulsion comprising an acrylic copolymer particle dispersed in an aqueous medium, (B) a crosslinking agent comprising a hydrophilic aliphatic isocyanate, and (C) a silane compound incorporated into the crosslinking agent (B) are disclosed. In some embodiments, the silane compound (C) incorporated into the crosslinking agent (B) is selected from the group consisting of (3-Glycidyloxypropyl) trimethoxysilane, 3-(Triethoxysilyl)propyl isocyanate, and combinations thereof. Methods for preparing water-based acrylic adhesive compositions also disclosed. Methods for preparing a laminate structure suitable for use in a flexible food packaging article are still further disclosed. Flexible food packaging articles including the disclosed water-based acrylic adhesive compositions are also disclosed.

8 Claims, No Drawings

WATER BASED ADHESIVES FOR HIGH PERFORMANCE APPLICATIONS IN FLEXIBLE FOOD PACKAGING

REFERENCE TO RELATED APPLICATIONS

The present application claims the benefit of Italian Application No. 102017000091909, filed on Aug. 8, 2017.

FIELD OF THE DISCLOSURE

The instant disclosure relates to water-based adhesive compositions. More particularly, the disclosure relates to water-based acrylic adhesive compositions. In some embodiments, the water-based acrylic adhesive compositions are suitable for use in, for example, laminate structures used inflexible food packaging applications. The water-based acrylic adhesive compositions provide for laminate structures having improved chemical and thermal properties. The disclosure further relates to methods of making such water-based acrylic adhesive compositions and flexible food packaging comprising the water-based acrylic adhesive compositions.

BACKGROUND AND SUMMARY OF THE DISCLOSURE

Adhesive compositions are useful for a wide variety of purposes. For instance, some adhesives are used to adhere layers of substrates together, thereby forming laminate structures comprising two or more substrate layers. Flexible packaging laminating adhesives are applied between laminating films for packaging of foodstuffs, pharmaceuticals, and industrial consumables. Laminating adhesives can be classified generally into three categories: (1) solvent-based laminating adhesives, (2) solventless laminating adhesives, and (3) water-based laminating adhesives. Within the solvent-based category, solvent-based adhesives have been widely used to achieve relatively good heat, moisture, and chemical resistance. As a result, the present market for laminating adhesives for high-performance applications (e.g., retort, boil-in-bag, etc.) has been dominated by solvent-based products. However, in recent years, the desire to reduce chemical solvent emissions and to improve ease of handling has driven the demand for improved solventless and water-based systems.

Within the water-based category, the adhesives can be acrylic-based, polyurethane-based, or epoxy-based, from a chemistry perspective. Commercial acrylic-based products available in the market are typically one-component or two-component systems, based on acrylic polymers. However, these traditional acrylic systems are generally limited to use in laminate structures for use in low and medium-performance end-use applications. That is, these systems do not exhibit sufficient thermal or chemical resistance to be used in laminate structures for use in high-performance end-use applications (e.g., retort, boil-in-bag, pasteurization, sterilization, etc.). This is particularly true where the laminate structures to be adhered include one or more aluminum foil layers.

Accordingly, water-based acrylic adhesive compositions suitable for use in high-performance end-use applications, are desirable.

Water-based acrylic adhesive compositions exhibiting higher thermal and chemical resistance, relative to existing water-based acrylic adhesives, for use in high-performance end-use applications are disclosed. The disclosed water-based acrylic adhesive compositions generally include (A) an acrylic emulsion having an acrylic copolymer particle dispersed in an aqueous medium, (B) a crosslinking agent including a hydrophilic aliphatic isocyanate, and (C) a silane compound incorporated into the crosslinking agent (B). In some embodiments, the silane compound (C) incorporated into the crosslinking agent (B) is selected from the group consisting of (3-Glycidyloxypropyl)trimethoxysilane, 3-(Triethoxysilyl)propyl isocyanate, and combinations thereof. In some embodiments, the weight ratio of the acrylic emulsion (A) to the crosslinking agent (B) and the silane compound (C), i.e., (A)=((B)+(C)), is from 100:1 to 100:10.

Methods for preparing water-based acrylic adhesive compositions are also disclosed. In some embodiments, the methods include providing an acrylic emulsion (A) having an acrylic copolymer particle dispersed in an aqueous medium, providing a crosslinking agent (B) including a hydrophilic aliphatic isocyanate, incorporating a silane compound (C) into the crosslinking agent (B), and mixing the acrylic emulsion (A) with the crosslinking agent (B) having the silane compound (C) incorporated therein, thereby forming the water-based acrylic adhesive composition.

Methods for preparing a laminate structures suitable for use in a flexible food packaging article are still further disclosed. In some embodiments, the methods include providing a water-based acrylic adhesive composition by providing an acrylic emulsion (A) having an acrylic copolymer particle dispersed in an aqueous medium, providing a crosslinking agent (B) including a hydrophilic aliphatic isocyanate, incorporating a silane compound (C) into the crosslinking agent (B), and mixing the acrylic emulsion (A) with the crosslinking agent (B) having the silane compound (C) incorporated therein, thereby forming a water-based acrylic adhesive composition. The methods further include applying the water-based acrylic adhesive composition on a surface of a first substrate, bringing the water-based acrylic adhesive composition on the surface of the first substrate into contact with a surface of a second substrate, and curing the water-based acrylic adhesive composition, thereby forming the laminate structure.

Flexible food packaging articles including the disclosed water-based acrylic adhesive compositions and made according to the disclosed methods are also disclosed.

DETAILED DESCRIPTION OF THE DISCLOSURE

In some embodiments, the disclosed water-based acrylic adhesive compositions comprise (A) an acrylic emulsion comprising an acrylic copolymer particle dispersed in an aqueous medium, (B) a crosslinking agent comprising a hydrophilic aliphatic isocyanate, and (C) a silane compound incorporated into the crosslinking agent (B).

(A) Acrylic Emulsion

The disclosed acrylic emulsions can be formed by any known polymerization techniques, such as by emulsion polymerization. For example, a monomer mixture may be dispersed throughout an aqueous medium together with a surfactant, thereby forming an aqueous monomer emulsion. The surfactant acts as a emulsifier and enables droplets of the monomer mixture, which is hydrophobic, to form throughout the aqueous medium. An initiator is then introduced into the aqueous monomer emulsion. The initiator reacts with the monomer mixture dispersed throughout the aqueous medium until all or substantially all of the monomer mixture is polymerized. Where the monomer mixture includes acrylic-based monomers, the end result is an acrylic emulsion comprising a dispersion of acrylic copolymer particles in the aqueous medium, the polymer particles comprising constituent units each being derived from a particular monomer in the monomer mixture. As used herein, "copolymer" refers to a polymer in which two or more different types of monomers are joined in the same polymer chain (including, e.g., terpolymers, quaterpolymers, etc.).

In some embodiments, the monomer mixture comprises an unsaturated monomer. In some embodiments, the unsaturated monomer is an olefinically unsaturated monomer. Suitable olefinically unsaturated monomers include esters of monoethylenically unsaturated carboxylic acids having 3 to 24 carbon atoms, in particular esters of acrylic and methacrylic acid, including methyl acrylate ("MA"), ethyl acrylate ("EA"), butyl acrylate ("BA"), butyl methacrylate, isobutyl acrylate, isobutyl methacrylate, 2-ethylhexyl acrylate ("EHA"), isoamyl acrylate, isoamyl methacrylate, 2-ethylhexyl methacrylate, isooctyl acrylate, isooctyl methacrylate, n-propyl acrylate, isopropyl acrylate, methyl methacrylate ("MMA"), decyl acrylate, decyl methacrylate, dodecyl acrylate, and dodecyl methacrylate. α,β-Monoethylenically unsaturated mono- or dicarboxylic acids of 3 to 6 carbon atoms, such as acrylic acid ("AA"), methacrylic acid, itaconic acid, fumaric acid and maleic acid, and the anhydrides of mono-olefinically unsaturated dicarboxylic acids, such as maleic anhydride and itaconic anhydride, are also suitable. Other useful olefinically unsaturated monomers are amides, such as acrylamide, methacrylamide, tetrahydrofurfurylacrylamide, tetrahydrofurfurylmethacrylamide, diacetoneacrylamide, hydroxyalkyl acrylates and methacrylates, such as 2-hydroxyethyl acrylate, 2-hydroxyethyl methacrylate, 4-hydroxybutyl acrylate and 4-hydroxybutyl methacrylate, and monomers such as 2-ketobutyl acrylate, 2-ketobutyl methacrylate, N-vinylformamide, N-vinylpyrrolidone, 2-methylene-1,3-dioxepan, 2-methylene-1,3-dioxolane, N-methyl-2-methyleneoxazolidine and 2-methylene-1,3-thiolene. Still other useful olefinically unsaturated monomer include ethylene, propylene, isobutylene, butadiene, isoprene, vinyl methyl ether, vinyl isobutyl ether, vinylpyridine, β-aminoethyl vinyl ether, aminopentyl vinyl ether, tert-butylaminoethyl methacrylate, vinylaromatics, such as styrene or methylstyrenes, and vinyl acetate ("VA").

Commercially available examples of acrylic emulsions suitable for use according to this disclosure include those sold by The Dow Chemical Company under the trade name ROBOND™, such as ROBOND™ L-350.

(B) Crosslinking Agent

In some embodiments, the crosslinking agent (B) includes an aliphatic isocyanate. As used herein, an "aliphatic isocyanate" contains an isocyanate radical bonded to an aliphatic radical which can be bonded to other aliphatic groups, a cycloaliphatic radical, or an aromatic ring (radical). Cycloaliphatic isocyanates are a subset of aliphatic isocyanates, wherein the chemical chain is ring-structured. In some embodiments, the crosslinking agent (B) includes a hydrophilic aliphatic isocyanate.

Suitable aliphatic isocyanates have 3 to 18 carbon atoms in the linear or branched alkylene residue, or in the cycloalkylene residue. Suitable aliphatic isocyanates include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate ("TIN"), decane di- and triisocyanate, undecane di- and triisocyanate and dodecane di- and triisocyanate, isophorone diisocyanate ("IPDI"), hexamethylene diisocyanate ("HDI"), diisocyanatodicyclohexylmethane ("H$_{12}$MDI"), 2-methylpentane diisocyanate ("MPDI"), 2,2,4-trimethylhexamethylene diisocyanate/2,4,4-trimethylhexamethylene diisocyanate ("TMDI"), norbornane diisocyanate ("NBDI"), xylylene diisocyanate ("XDI"), tetramethylxylylene diisocyanate, and dimers, trimers, and mixtures thereof. Additional isocyanates suitable for use according to this disclosure include, but are not limited to, 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methyl-pentane, and mixtures thereof.

In some embodiments, the crosslinking agent (B) accounts for from 90 to 96 weight percent of the total weight of the crosslinking agent (B) and the silane compound (C), or from 92 to 94 weight percent of the total weight of the crosslinking agent (B) and the silane compound (C), or 93 weight percent of the total weight of the crosslinking agent (B) and the silane compound (C).

(C) Silane Compound

In some embodiments, the silane compound (C) is an organosilane. Such compounds have two notable elements: (1) a non-hydrolysable organic moiety that interacts with the polymeric matrix; and (2) a hydrolysable group that can provide a linkage between inorganic substrates. Given their dual reactivity, organosilanes can serve as bridges between inorganic substrates, such as metals, and a polymer. Where one of the substrates in a laminate structure includes aluminum foil, it is thought that incorporation of the silane compound (C) into the crosslinking agent (B) forms covalent bonds between the acrylic adhesive (A) and the aluminum foil substrate. At the same time, the presence of the crosslinking agent (B) improves the hardness of the adhesive system via crosslinking.

In some embodiments, the silane compound (C) incorporated into the crosslinking agent (B) is an organosilane selected from the group consisting of (3-Glycidyloxypropyl) trimethoxysilane, 3-(Triethoxysilyl)propyl isocyanate, and combinations thereof.

In some embodiments, the silane compound (C) accounts for from 4 to 10 weight percent of the total weight of the crosslinking agent (B) and the silane compound (C), or from 6 to 8 weight percent of the total weight of the crosslinking agent (B) and the silane compound (C), or 7 weight percent of the total weight of the crosslinking agent (B) and the silane compound (C).

Adhesive Compositions

In some embodiments, the mix ratio, by weight, of the acrylic emulsion (A) to the total weight of the crosslinking agent (B) and the silane compound (C), i.e., (A): ((B)+(C)) in the water-based acrylic adhesive composition is from 100:1 to 100:10, or from 100:2 to 100:8, or from 100:3 to 100:5, or 100:4.

Methods for preparing water-based acrylic adhesive compositions also disclosed. In some embodiments, the methods include providing an acrylic emulsion (A) comprising an acrylic copolymer particle dispersed in an aqueous medium, providing a crosslinking agent (B) comprising a hydrophilic aliphatic isocyanate, incorporating a silane compound (C) into the crosslinking agent (B), and mixing the acrylic emulsion (A) with the crosslinking agent (B) having the silane compound (C) incorporated therein, thereby forming the water-based acrylic adhesive composition.

Methods for preparing a laminate structure suitable for use in a flexible food packaging article are still further disclosed. In some embodiments, the methods include providing a water-based acrylic adhesive composition by providing an acrylic emulsion (A) comprising an acrylic copolymer particle dispersed in an aqueous medium, providing a crosslinking agent (B) comprising a hydrophilic aliphatic isocyanate, incorporating a silane compound (C) into the crosslinking agent (B), and mixing the acrylic emulsion (A) with the crosslinking agent (B) having the silane compound (C) incorporated therein, thereby forming a water-based acrylic adhesive composition. The methods further include applying the water-based acrylic adhesive composition on a surface of a first substrate and bringing the water-based acrylic adhesive composition on the surface of the first substrate into contact with a surface of a second substrate. In some embodiments, the first substrate and second substrate are run through a device for applying external pressure to the first and second substrates, such as nip roller. Arrangements of such rollers in an application apparatus are commonly known in the art. The method further includes curing, or allowing to cure, the water-based acrylic adhesive composition, thereby forming the laminate structure. Curing may occur at any temperature, e.g., from room temperature (i.e., approximately 25° C.) up to 50° C. or higher. In some embodiments, the coating weight of the applied adhesives to the film substrates is from 1 to 10 g/m².

Suitable substrates in the laminate structure include films such as paper, woven and nonwoven fabric, metal foil, polymer films, and metal-coated polymer films. Some films optionally have a surface on which an image is printed with ink which may be in contact with the adhesive composition. In some embodiments, the first substrate and second substrate are each selected from the group consisting of oriented polypropylene, polyethylene terephthalate, nylon, polyethylene, cast polypropylene, and aluminum foil. The substrates are layered to form a laminate structure, with an adhesive composition according to this disclosure adhering one or more of the substrates together. In some embodiments, the first substrate and second substrate are identical, while in other embodiments the first substrate and second substrate are not identical.

EXAMPLES OF THE DISCLOSURE

The present disclosure will now be described in further detail by discussing Illustrative Examples ("IE") and Comparative Examples ("CE") (collectively "the Examples"). However, the scope of the present disclosure is not, of course, limited to the Examples.

The raw materials identified in Table 1 are used, along with other materials, in the preparation of the Examples.

TABLE 1

| Pertinent Raw Materials | | |
| --- | --- | --- |
| Material | General Description | Supplier |
| BAYDUR ™ 304 | Hydrophilitc, aliphatic isocyanate having a viscosity of 2,500 to 5,500 mPa · s measured according to AFP-1002 | Covestro |

TABLE 1-continued

| Pertinent Raw Materials | | |
| --- | --- | --- |
| Material | General Description | Supplier |
| (3-Glycidyloxy-propyl) trimethoxy-silane | CAS Number 2530-83-8, organosilane | Momentive |
| 3-(Triethoxy-silyl) propyl isocyanate | CAS Number 24801-88-5, organosilane | Momentive |
| ROBOND ™ L-350 | Water-based acrylic emulsion having a solids content of approximately 45 wt % | The Dow Chemical Company |
| ROBOND ™ L-300 | Water-based acrylic emulsion having a solids content of approximately 45 wt % | The Dow Chemical Company |

Illustrative Example 1 ("IE1") Preparation

IE1 is prepared as follows: about 480 grams of CR-3 (96% w/w) is charged to a one-liter reactor equipped with an overhead stirrer and a thermometer, under nitrogen atmosphere. The reactor contents are heated with a water bath at 50° C. and kept under stirring. 20 grams of 3-Glycidoxy-propyltrimetoxysilane (4% w/w) is then added to the reactor. The mixture is left under stirring until it is homogeneous. The resulting mixture is a combination of CR-3 and 3-Glycidoxypropyltrimetoxysilane.

Illustrative Example 2 ("IE2") Preparation

IE2 is prepared as follows: about 480 grams of CR-3 (96% w/w) is charged to a one-liter reactor equipped with an overhead stirrer and a thermometer, under nitrogen atmosphere. The reactor contents are heated with a water bath at 50° C. and kept under stirring. 20 grams of 3-(Triethoxysilyl) propyl isocyanate (4% w/w) is then added to the reactor. The mixture is left under stirring until it is homogeneous. The resulting mixture is a combination of CR-3 and 3-(Triethoxysilyl) propyl isocyanate.

Illustrative Example 3 ("IE3") Preparation

IE2 is prepared as follows: about 450 grams of CR-3 (90% w/w) is charged to a one-liter reactor equipped with an overhead stirrer and a thermometer, under nitrogen atmosphere. The reactor contents are heated with a water bath at 50° C. and kept under stirring. 50 grams of 3-(Triethoxysilyl) propyl isocyanate (10% w/w) is then added to the reactor. The mixture is left under stirring until it is homogeneous. The resulting mixture is a combination of CR-3 and 3-(Triethoxysilyl) propyl isocyanate.

Adhesives Preparation

Each of IE1, IE2, and IE3 is mixed with ROBOND™ L-350 at the mix ratio (by weight) indicated in Table 2 and/or Table 3 to form the water-based acrylic adhesive compositions used in the laminate structures of the Examples. Comparative Examples CE1 and CE2 include adhesive compositions that are a mixture of CR-3 and ROBOND™ L-350 at the mix ratio (by weight) indicated in Table 2 and Table 3. The Comparative Examples do not contain any silane compound.

Performance Testing

Testing is performed on laminate structures comprising polyester ("PET")//aluminum foil ("ALU")//polyethylene ("PE") layers and PET//ALU//cast polypropylene ("CPP") layers. The performance tests are carried out using a LABO COMBI™ 400 laminator, commercially available from Nordmeccanica. The laminator conditions are as follows: adhesive temperature of room temperature (~25° C.), nip temperature of 60° C., machine speed of 30 m/min, drying temperatures of 75-85-95° C., applied-adhesive solids content of 45% by weight, coating weight of 2 to 5 g/m². For the laminate structures including a CPP film, the CPP film is corona treated.

Bond strengths for the test samples are tested by cutting sample pieces to the exact width of 1.5 mm and length approximately 250 mm. The two edges of the specimen locked into the clamps of an Instron. The free part is than kept at 90° with respect to the sliding direction. The result of the test s the average force required to separate each film. The final result is the average of the specimens analyzed. If one or more films break, the result is the maximum peak before the material breaks Bond strength after thermal treatments are usually measured following the above indicated procedure. Typically, the test specimens are coming from pouches produced with the laminates under test and tested in autoclave after filling with different materials, according to the final use of the coupled. The commonly used materials for filling the pouches are water, wet saw, and blends of aggressive foodstuffs, but other materials can be used according to the final applications of the laminates in question.

After the thermal treatment a visual evaluation of the appearance of the pouches is carried out in order to observe presence of delamination, channels, and blisters before proceeding with the bond strength measurement.

Table 2 details performance results from tests carried out on PET//ALU//CPP laminate structures. The bond strength is analyzed at one and seven day intervals, as well as in retort conditions. In order to better understand the behavior of the adhesive, failure modes are indicated in Table 2, such as "a" indicating adhesive on, "t" indicating film tear, "c" indicating cohesive adhesive split. "Adhesive on" indicates that after measuring the bond strength the adhesive can have higher affinity with one of the films of the laminate structure. By way of example, if the laminate structure is PET//PE, and after measuring the bond strength the indicator is "a PE", this is indicative that the adhesive stayed on the PE film after delamination for bond measurement. "Film tear" indicates that the bond strength value is so high that the adhesive is able to break the film. "Cohesive adhesive split" indicates that the adhesive has affinity with both films. That is, the adhesion of the adhesive to the films is very high and once laminate structure is torn the adhesive exhibits a cohesive behavior.

As illustrated in Table 2, IE4, IE5, and IE6, each containing CR3 having a silane compound incorporated therein, generally exhibit better bond strength compared to CE1. In particular, the bond strength values obtained incorporating 10% by weight 3-(Triethoxysilyl)propyl isocyanate into CR3 (IE3) are highest in the strongest condition (134° C. for 30 minutes).

Table 3 details performance results from tests carried out on PET//ALU//PE laminate structures. As with the PET//ALU//CPP laminate structures, the bond strength is analyzed at one and seven day intervals, as well as in retort conditions. Retort conditions are typically 121 to 134° C. for 20, 30, or 50 minute intervals. Pasteurization conditions are typically 95° C. for 20, 30, or 50 minutes, or up to 2 hours.

TABLE 3

Lamination Trials Performance Data (PET//ALU//PE)

| Example | Adhesive Components/Mix Ratio (wt) | Bond Strength (N/15 mm) | | Thermal Treatment 95° C. |
|---|---|---|---|---|
| | | 1 day | 7 day | 30 min |
| CE2 | ROBOND ™ L-350 and CR3/100:2 | 2.1 a. PET 1.6 a. PE | 2.4 a. PET 1.7 a. PE | 3.4 t. PET 3.0 a. PE |
| IE7 | ROBOND ™ L-350 and (CR3 + IE1)/100:4 | 1.9 a. PET 2.0 a. PE | 2.6 a. PET 2.2 a. PE | 3.8 t. PET 5.0 a. PE |
| IE8 | ROBOND ™ L-350 and (CR3 + IE2)/100:4 | 2.7 a. PET 2.4 a. PE | 3.2 a. PET 2.4 a. PE | 2.5 t. PET 3.3 a. PE |
| IE9 | ROBOND ™ L-350 and (CR3 + IE3)/100:4 | 3.1 a. PET 2.6 a. PE | 3.5 a. PET 2.5 a. PE | 3.1 t. PET 3.8 a. PE | a: adhesive on
t: film tear

As illustrated in Table 3, IE7, IE8, and IE9, each containing CR3 having a silane compound incorporated therein, generally exhibit better bond strength compared to CE2. After thermal treatments (95° C. for 30 minutes), IE7, having CR3 with 4% by weight of (3-Glycidyloxypropyl) trimethoxysilane, shows the best results.

In addition to the embodiments described above and those set forth in the Examples, many examples of specific combinations are within the scope of the disclosure, some of which are described below:

Example 1. A water-based acrylic adhesive composition, comprising:
 (A) an acrylic emulsion comprising an acrylic copolymer particle dispersed in an aqueous medium;

TABLE 2

Lamination Trials Performance Data (PET//ALU//CPP)

| Example | Adhesive Components/Mix Ratio (wt) | Bond Strength (N/15 mm) | | Thermal Treatment | |
|---|---|---|---|---|---|
| | | 1 day | 7 day | 121° C. 30 min | 134° C. 30 min |
| CE1 | ROBOND ™ L-350 and CR3/100:2 | 1.9 a. PET 1.8 a. CPP | 2.7 a. PET 2.4 a. CPP | 4.3 t. PET 2.6 a. ALU | 4 t. PET 3.1 a. ALU |
| IE4 | ROBOND ™ L-350 and (CR3 + IE1)/100:4 | 2.2 a. PET 2.4 a. CPP | 2.3 a. PET 5.8 a. CPP | 3.8 t. PET 4.4 a. cohesive | 4.0 t. PET 4.5 a. cohesive |
| IE5 | ROBOND ™ L-350 and (CR3 + IE2)/100:4 | 2.7 a. PET 2.6 a. CPP | 3.2 a. PET 4.8 a. CPP | 4.6 t. PET 4.0 a. CPP | 2.6 t. PET 4.0 a. cohesive |
| IE6 | ROBOND ™ L-350 and (CR3 + IE3)/100:4 | 3.1 a. PET 2.7 a. CPP | 3.5 a. PET 5.8 a. CPP | 4.0 t. PET 4.1 a. CPP | 2.6 t. PET 7.8 a. ALU | a: adhesive on
t: film tear
c: cohesive adhesive split (B) a crosslinking agent comprising a hydrophilic aliphatic isocyanate; and (C) a silane compound incorporated into the crosslinking agent (B).

Example 2. The water-based acrylic adhesive composition of any preceding or succeeding Example, wherein the acrylic copolymer particle is the emulsion polymerization product of a monomer mixture comprising an unsaturated monomer selected from the group consisting of methyl acrylate, ethyl acrylate, butyl acrylate, butyl methacrylate, isobutyl acrylate, 2-ethylhexyl acrylate, isobutyl methacrylate, isoamyl acrylate, isoamyl methacrylate, 2-ethylhexyl methacrylate, isooctyl acrylate, isooctyl methacrylate, n-propyl acrylate, isopropyl acrylate, methyl methacrylate, decyl acrylate, decyl methacrylate, dodecyl acrylate, dodecyl methacrylate, acrylic acid, methacrylic acid, itaconic acid, fumaric acid, maleic acid, maleic anhydride, itaconic anhydride, acrylamide, methacrylamide, tetrahydrofurfurylacrylamide, tetrahydrofurfurylmethacrylamide, diacetoneacrylamide, 2-hydroxyethyl acrylate, 2-hydroxyethyl methacrylate, 4-hydroxybutyl acrylate, 4-hydroxybutyl methacrylate, 2-ketobutyl acrylate, 2-ketobutyl methacrylate, N-vinylformamide, N-vinylpyrrolidone, 2-methylene-1,3-dioxepan, 2-methylene-1,3-dioxolane, N-methyl-2-methyleneoxazolidine, 2-methylene-1,3-thiolene, ethylene, propylene, isobutylene, butadiene, isoprene, vinyl methyl ether, vinyl isobutyl ether, vinylpyridine, β-aminoethyl vinyl ether, aminopentyl vinyl ether, tert-butylaminoethyl methacrylate, styrene, methylstyrene, vinyl acetate, and combinations thereof.

Example 3. The water-based acrylic adhesive composition of any preceding or succeeding Example, wherein the silane compound (C) accounts for from 4 to 10 weight percent of the total weight of the crosslinking agent (B) and the silane compound (C).

Example 4. The water-based acrylic adhesive composition of any preceding or succeeding Example, wherein the silane compound (C) accounts for from 6 to 8 weight percent of the total weight of the crosslinking agent (B) and the silane compound (C).

Example 5. The water-based acrylic adhesive composition of any preceding or succeeding Example, wherein the silane compound (C) is an organosilicon.

Example 6. The water-based acrylic adhesive composition of any preceding or succeeding Example, wherein the silane compound (C) is selected from the group consisting of (3-Glycidyloxypropyl)trimethoxysilane, 3-(Triethoxysilyl)propyl isocyanate, and combinations thereof.

Example 7. The water-based acrylic adhesive composition of any preceding or succeeding Example, wherein the silane compound (C) is (3-Glycidyloxypropyl)trimethoxysilane.

Example 8. The water-based acrylic adhesive composition of any preceding or succeeding Example, wherein the silane compound (C) is 3-(Triethoxysilyl)propyl isocyanate.

Example 9. The water-based acrylic adhesive composition of any preceding or succeeding Example, wherein the weight ratio of the acrylic emulsion (A) to the crosslinking agent (B) and the silane compound (C) is from 100:1 to 100:10.

Example 10. The water-based acrylic adhesive composition of any preceding or succeeding Example, wherein the weight ratio of the acrylic emulsion (A) to the crosslinking agent (B) and the silane compound (C) is from 100:3 to 100:5.

Example 11. The water-based acrylic adhesive composition of any preceding or succeeding Example, wherein the weight ratio of the acrylic emulsion (A) to the crosslinking agent (B) and the silane compound (C) is 100:4.

Example 12. A method for preparing a water-based acrylic adhesive composition suitable for use in a flexible food packaging article, the method comprising:

providing an acrylic emulsion (A) comprising an acrylic copolymer particle dispersed in an aqueous medium;

providing a crosslinking agent (B) comprising a hydrophilic aliphatic isocyanate;

incorporating a silane compound (C) into the crosslinking agent; and mixing the acrylic emulsion (A) with the crosslinking agent (B) having the silane compound (C) incorporated therein, thereby forming the water-based acrylic adhesive composition.

Example 13. A method for preparing a laminate structure suitable for use in a flexible food packaging article, the method comprising:

providing a water-based acrylic adhesive composition by:
providing an acrylic emulsion (A) comprising an acrylic copolymer particle dispersed in an aqueous medium;
providing a crosslinking agent (B) comprising a hydrophilic aliphatic isocyanate;
incorporating a silane compound (C) into the crosslinking agent; and
mixing the acrylic emulsion (A) with the crosslinking agent (B) having the silane compound (C) incorporated therein, thereby forming a water-based acrylic adhesive composition;

applying the water-based acrylic adhesive composition on a surface of a first substrate;

bringing the water-based acrylic adhesive composition on the surface of the first substrate into contact with a surface of a second substrate; and curing the water-based acrylic adhesive composition, thereby forming the laminate structure.

Example 14. The method of preparing a laminate structure suitable for use in a flexible food packaging application of any preceding or succeeding Example, wherein the mixing the acrylic emulsion (A) with the crosslinking agent (B) having the silane compound (C) incorporated therein weight ratio of from 100:1 to 100:10.

Example 15. The method of preparing a laminate structure suitable for use in a flexible food packaging application of any preceding or succeeding Example, wherein the first substrate and second substrate are each selected from the group consisting of oriented polypropylene, polyethylene terephthalate, nylon, polyethylene, and cast polypropylene.

Example 16. The method of preparing a laminate structure suitable for use in a flexible food packaging application of any preceding or succeeding Example, wherein the first substrate and second substrate are not identical.

Example 17. A flexible food packaging article comprising the water-based acrylic adhesive composition of any preceding or succeeding Example.

The invention claimed is:

1. A water-based acrylic adhesive composition, comprising:
(A) an acrylic emulsion comprising an acrylic copolymer particle dispersed in an aqueous medium;
(B) a crosslinking agent comprising a hydrophilic aliphatic isocyanate; and
(C) a silane compound incorporated into the crosslinking agent (B);

wherein the silane compound (C) accounts for from 4 to 10 weight percent of the total weight of the crosslinking agent (B) and the silane compound (C).

2. The water-based acrylic adhesive composition of claim 1, wherein the silane compound (C) is an organosilicon.

3. The water-based acrylic adhesive composition of claim 1, wherein the silane compound (C) is selected from the group consisting of (3-Glycidyloxypropyl)trimethoxysilane, 3-(Triethoxysilyl)propyl isocyanate, and combinations thereof.

4. The water-based acrylic adhesive composition of claim 1, wherein the silane compound (C) is (3-Glycidyloxypropyl)trimethoxysilane.

5. The water-based acrylic adhesive composition of claim 1, wherein the silane compound (C) is 3-(Triethoxysilyl)propyl isocyanate.

6. The water-based acrylic adhesive composition of claim 1, wherein the weight ratio of the acrylic emulsion (A) to the crosslinking agent (B) and the silane compound (C) is from 100:1 to 100:10.

7. A method for preparing a water-based acrylic adhesive composition suitable for use in a flexible food packaging article, the method comprising:
   providing an acrylic emulsion (A) comprising an acrylic copolymer particle dispersed in an aqueous medium;
   providing a crosslinking agent (B) comprising a hydrophilic aliphatic isocyanate;
   incorporating a silane compound (C) into the crosslinking agent, wherein the silane compound (C) accounts for from 4 to 10 weight percent of the total weight of the crosslinking agent (B) and the silane compound (C); and
   mixing the acrylic emulsion (A) with the crosslinking agent (B) having the silane compound (C) incorporated therein, thereby forming the water-based acrylic adhesive composition.

8. A method for preparing a laminate structure suitable for use in a flexible food packaging article, the method comprising:
   providing a water-based acrylic adhesive composition by:
      providing an acrylic emulsion (A) comprising an acrylic copolymer particle dispersed in an aqueous medium;
      providing a crosslinking agent (B) comprising a hydrophilic aliphatic isocyanate;
      incorporating a silane compound (C) into the crosslinking agent, wherein the silane compound (C) accounts for from 4 to 10 weight percent of the total weight of the crosslinking agent (B) and the silane compound (C); and
      mixing the acrylic emulsion (A) with the crosslinking agent (B) having the silane compound (C) incorporated therein, thereby forming a water-based acrylic adhesive composition;
   applying the water-based acrylic adhesive composition on a surface of a first substrate;
   bringing the water-based acrylic adhesive composition on the surface of the first substrate into contact with a surface of a second substrate; and
   curing the water-based acrylic adhesive composition, thereby forming the laminate structure.

* * * * *